(12) United States Patent
Kim

(10) Patent No.: US 12,709,145 B2
(45) Date of Patent: Aug. 18, 2026

(54) MOTOR MOUNT DEVICE FOR AN ELECTRIC VEHICLE

(71) Applicants: HYUNDAI MOTOR COMPANY, Seoul (KR); KIA CORPORATION, Seoul (KR)

(72) Inventor: Seung Won Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 552 days.

(21) Appl. No.: 18/131,734

(22) Filed: Apr. 6, 2023

(65) Prior Publication Data

US 2024/0157778 A1 May 16, 2024

(30) Foreign Application Priority Data

Nov. 16, 2022 (KR) ........................ 10-2022-0153206

(51) Int. Cl.
*B60K 5/12* (2006.01)

(52) U.S. Cl.
CPC .................................. *B60K 5/1208* (2013.01)

(58) Field of Classification Search
CPC ............ B60K 5/1208; B60K 1/00; F16F 1/38
See application file for complete search history.

(56) References Cited

U.S. PATENT DOCUMENTS 5,740,876 A * 4/1998 Shimose .............. B60K 5/1216 180/300
5,769,402 A * 6/1998 Ide ........................ F16F 13/264 267/140.14
7,032,701 B2 * 4/2006 Yoshida ............... B60K 5/1208 180/312
7,562,737 B2 * 7/2009 Miyahara ............. B60K 5/1208 180/300
7,874,395 B2 * 1/2011 Taji .......................... B60K 1/00 180/300
8,851,223 B2 * 10/2014 Yamashita ............... B60K 1/00 180/300
9,175,739 B2 * 11/2015 Ohnishi .................. F16F 15/08
9,428,040 B2 * 8/2016 Shibata ................ B62D 25/082
9,919,593 B2 * 3/2018 Oguri ...................... F16F 15/08
11,390,153 B2 * 7/2022 Cho ...................... F16F 13/085
11,781,613 B2 * 10/2023 Kim .................... F16F 13/1463 267/140.11
12,030,374 B2 * 7/2024 Cavnic ................... B62D 21/11
12,486,882 B2 * 12/2025 Kojima ................. F16F 13/107
12,496,892 B2 * 12/2025 Kim ..................... B60K 5/1208

(Continued)

*Primary Examiner* — James M Dolak
(74) *Attorney, Agent, or Firm* — Lempia Summerfield Katz LLC

(57) ABSTRACT

A motor mount device for an electric vehicle includes an inner pipe disposed along a front-rear direction of the vehicle, an outer pipe disposed coaxially with and around an outside of the inner pipe, and a main damper with a bridge. The bridge defines an upper chamber and a lower chamber between the inner pipe and the outer pipe along the front-rear direction and the main damper is elastically deformable according to a load transmitted through the inner pipe. The device also includes a middle plate disposed between the main damper and the outer pipe and configured to support a load in the front-rear direction transmitted through the inner pipe by compressing the bridge.

13 Claims, 5 Drawing Sheets

(56) References Cited

U.S. PATENT DOCUMENTS

| | | | | |
|---|---|---|---|---|
| 12,515,511 | B2 * | 1/2026 | Kurita | B60K 1/00 |
| 12,522,063 | B2 * | 1/2026 | Kümmel | B60K 1/04 |
| 12,545,093 | B2 * | 2/2026 | Yun | B60K 5/1208 |
| 2013/0292888 | A1 * | 11/2013 | Hwang | B60K 5/1208 267/140.13 |

* cited by examiner

MOTOR MOUNT DEVICE FOR AN ELECTRIC VEHICLE

CROSS REFERENCE TO RELATED APPLICATION

The present application claims priority to Korean Patent Application No. 10-2022-0153206, filed Nov. 16, 2022, the entire contents of which are incorporated herein for all purposes by this reference.

BACKGROUND

Field of the Disclosure

The present disclosure relates to a motor mount device for an electric vehicle and, more particularly, to a motor mount device for an electric vehicle capable of decreasing whine or high pitched noise by increasing only front-rear direction damping characteristics and maintaining up-down direction characteristics to be relatively low.

Description of the Related Art

In general, vehicles equipped with gasoline or diesel engines using fossil fuels have many drawbacks such as environmental pollution due to exhaust gas, contribution to global warming due to generation of carbon dioxide, and contribution to respiratory diseases due to ozone generation.

In addition, the quantity of fossil fuels existing on earth are limited, so fossil fuels are in danger of being exhausted someday.

Therefore, vehicles such as an electric vehicle (EV) driven by operating a driving motor, a hybrid electric vehicle (HEV) driven by an engine and a driving motor, a fuel cell electric vehicle (FCEV) driven by a driving motor by power generated from fuel cells, and the like have been developed.

In general, a combustion engine of a vehicle not only vibrates all the time due to a structural characteristic, but also vibrates in all directions due to a combination of various factors depending on bumps and the like encountered while driving.

In particular, in a vehicle with a gasoline engine, pistons operate in the order of intake, compression, explosion, and exhaust through a four-stroke cycle and generate rotational torque of a crankshaft. Significant vibration is generated during this process.

In order to insulate or isolate these vibrations, development of engine mounts supporting the engine of a vehicle continues. In particular, various studies are being conducted with the goal of securing a sufficient insulation rate for the main excitation force generated by a gasoline engine.

However, an electric vehicle using a driving motor does not have a reciprocating piston motion caused by an explosion, and the like, such as a vehicle using a gasoline engine. Accordingly, a role or function of the motor mount should be different from the role of the engine mount of a vehicle using a gasoline engine, which is to insulate or isolate shock vibration, jerk vibration, driving vibration, gear grinding noise, and the like.

To this end, in the case of a motor mount device applied to an electric vehicle platform, axial direction damping characteristics are lower compared to left-right or up-down direction damping characteristics. The electric drive motor needs to perform significantly in the axial direction causing a feeling of an aftershock to become inevitably worse. In addition, it is not possible to selectively increase only the axial direction damping characteristics, so the overall damping characteristics of the motor mount increase as the axial direction damping characteristics are increased. Through this, the damping characteristics of the platform gradually increase, and the Z-direction (radial direction) characteristics also increase. This results in a problem in that whine noise that is generated gradually becomes worse.

The foregoing is intended merely to aid in understanding the background of the present disclosure. The foregoing is not intended to mean that the present disclosure falls within the purview of the related art that is already known to those of ordinary skill in the art.

SUMMARY

Accordingly, the present disclosure has been made keeping in mind the above problems occurring in the related art. An objective of the present disclosure is to provide a motor mount device for an electric vehicle capable of decreasing a whine noise. According to the present disclosure, a bulge-type inner pipe is applied but, with respect to the inner pipe having such a bulge shape, a main damper, in which an upper chamber and a lower chamber are provided, is coupled with a middle plate. The middle plate is configured to support the main damper to the inner pipe, while wrapping the inner pipe, so as to support the load in an axial direction. Additionally, according to the present disclosure, when the upper chamber and the lower chamber move in an up-down direction in a state of being sealed by an outer pipe, it is possible to increase selective front-rear damping characteristics by allowing air flow from the inside of the chambers through an air hole.

In order to achieve the above objectives, according to one embodiment of the present disclosure, a motor mount device for an electric vehicle is provided. The device includes an inner pipe disposed along a front-rear direction of the vehicle, an outer pipe disposed coaxially with the inner pipe outside the inner pipe, and a main damper having a bridge whereby an upper chamber and a lower chamber are defined between the inner pipe and the outer pipe along the front-rear direction. The main damper is elastically deformed according to a load transmitted through the inner pipe. The device also includes a middle plate disposed between the main damper and the outer pipe. The middle plate is provided to support a load in the front-rear direction transmitted through the inner pipe by compressing the bridge.

The inner pipe may have a central part with an outer diameter that is relatively larger than an outer diameter of each of opposite end parts of the inner pipe and that is disposed inside of the outer pipe.

The bridge may be provided to be inclined towards the central part of the inner pipe along the front-rear direction of the main damper.

In addition, the middle plate may be provided in a cylindrical shape including a pair of through holes having a size and shape corresponding to the upper chamber and the lower chamber. The middle plate also may be provided with opposite end parts in the front-rear direction surrounding the main damper, respectively. Each of the opposite end parts of the middle plate may be rounded.

In addition, the middle plate may be provided in a cylindrical shape including a pair of through holes having a size and shape corresponding to the upper chamber and the lower chamber. The middle plate also may be provided with opposite end parts in the front-rear direction surrounding the main damper, respectively. Each of the opposite end parts may be bent or curved.

In addition, the main damper may include air flow guides provided to allow air to flow inside of the outer pipe as an up-down direction load is applied to the inner pipe.

The air flow guides may be provided to pass through the main damper along the up-down direction and connect the upper chamber and the lower chamber to each other.

In addition, the air flow guides may be provided to respectively connect the upper chamber and the lower chamber to the outside, i.e., to the exterior of the device, by penetrating through the main damper including the bridge along the front-rear direction.

In addition, the air flow guides may be provided along an outer circumferential surface of the main damper, thereby connecting the upper chamber and the lower chamber to each other.

According to one embodiment of the present disclosure a motor mount device for an electric vehicle is provided. The device includes an inner pipe disposed along front-rear directions of the vehicle, an outer pipe disposed coaxially with the inner pipe outside the inner pipe, and a main damper with a bridge defining an upper chamber and a lower chamber between the inner pipe and the outer pipe along the front-rear direction. The main damper is provided to be elastically deformable according to a load transmitted through the inner pipe. The device also includes a middle plate disposed between the main damper and the outer pipe and provided to support a load in the front-rear direction transmitted through the inner pipe by compressing the bridge. The device further includes air flow guides provided in the main damper and configured to allow air to flow inside of the outer pipe as an up-down direction load is applied to the inner pipe.

The air flow guides may be provided to pass through the main damper along the up-down direction and connect the upper chamber and the lower chamber to each other.

In addition, the air flow guides may be provided to respectively connect the upper chamber and the lower chamber to the outside, i.e., to the exterior of the device, by penetrating through the main damper including the bridge along the front-rear directions.

In addition, the air flow guides may be provided along an outer circumferential surface of the main damper, thereby connecting the upper chamber and the lower chamber to each other.

As described above, the motor mount device of the present disclosure has an effect of decreasing whine noise, wherein a bulge-type inner pipe is applied. However, with respect to the inner pipe having a bulge shape, a main damper, in which an upper chamber and a lower chamber are provided, is coupled with a middle plate. The middle plate is configured to support the main damper to the inner pipe, while wrapping the inner pipe, so as to support the load in an axial direction. Additionally, according to the present disclosure, when the upper chamber and the lower chamber move in the up-down direction in a state of being sealed by the outer pipe, it is possible to increase selective front-rear damping characteristic by allowing air flow from the inside of the chambers through an air hole.

Accordingly, the present disclosure has an effect of solving the conventional problem that, when the front-rear direction damping characteristics of a motor mounting device are increased, the up-down direction characteristics are also increased.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Hereinbelow, embodiments of the present disclosure are described in detail with reference to the accompanying drawings.

Advantages and features of the present disclosure and a method of achieving the same should be clear with reference to the embodiments described below in detail in conjunction with the accompanying drawings.

However, the present disclosure is not limited by the embodiments disclosed below and may be implemented in a variety of different forms. In addition, these embodiments are provided only to make the disclosure of the present inventive concept complete and to fully inform those of ordinary skill in the art of the scope of the inventive concept to which the present disclosure belongs. The present inventive concept is defined only by the scope of the claims.

In addition, in the description of the present disclosure, where it has been determined that related known technologies may obfuscate the gist of the present disclosure, a detailed description thereof has been omitted. When a component, device, element, or the like of the present disclosure is described as having a purpose or performing an operation, function, or the like, the component, device, or element should be considered herein as being "configured to" meet that purpose or perform that operation or function.

Figure 1:
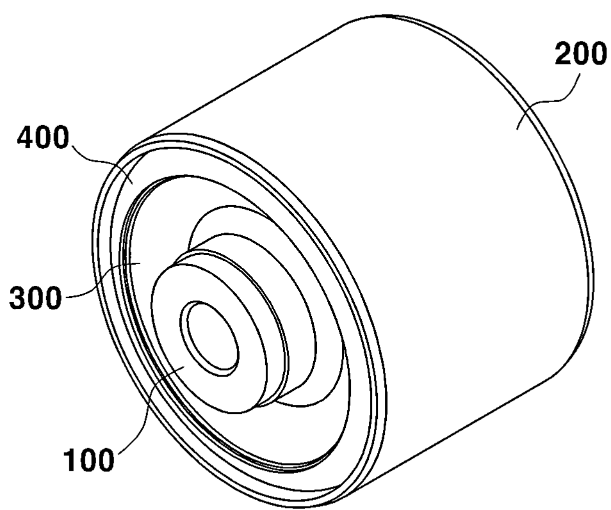
FIG. 1 is a view showing a motor mount device for an electric vehicle according to an embodiment of the present disclosure.
Figure 2:
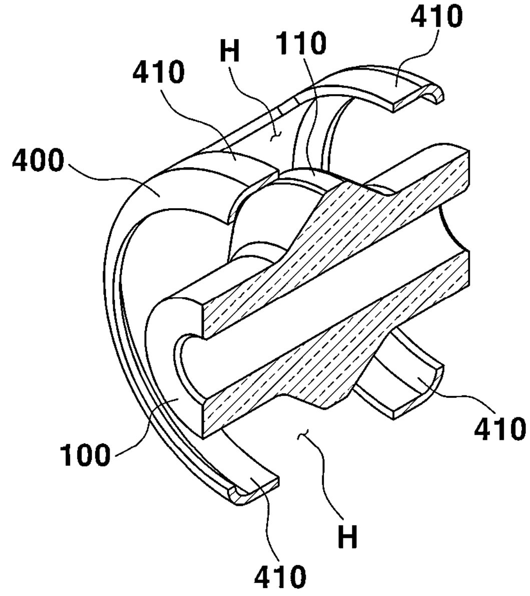
FIG. 2 is a view showing an inner pipe and a middle plate of the motor mount device for an electric vehicle according to an embodiment of the present disclosure.
Figure 3:
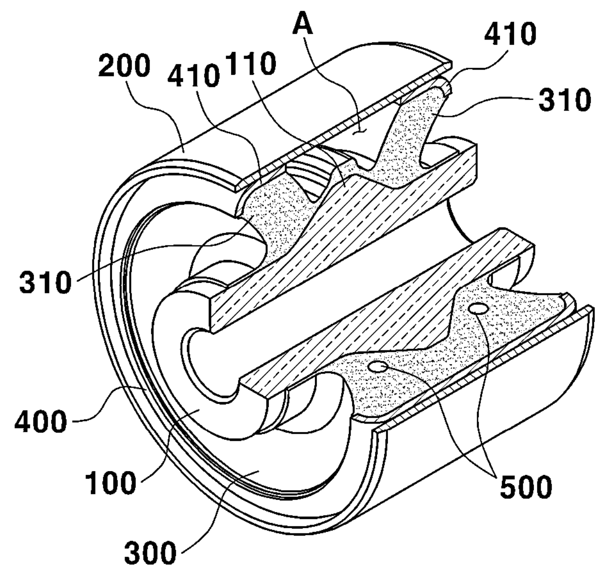
FIG. 3 is a view showing an upper chamber and a lower chamber of the motor mount device according to an embodiment of the present disclosure.

FIG. 1 is a view showing a motor mount device for an electric vehicle according to an embodiment of the present disclosure. FIG. 2 is a view showing an inner pipe and a middle plate of the motor mount device for an electric vehicle according to an embodiment of the present disclosure. FIG. 3 is a view showing an upper chamber and a lower chamber of the motor mount device for an electric vehicle according to an embodiment of the present disclosure.

Figure 4:
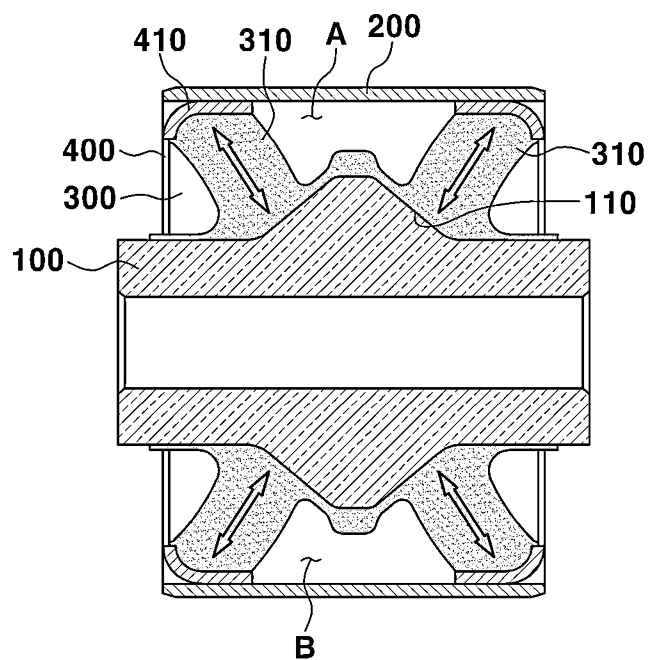
FIG. 4 is a view showing a bridge of the main damper of the motor mount device according to an embodiment of the present disclosure.
Figure 5:
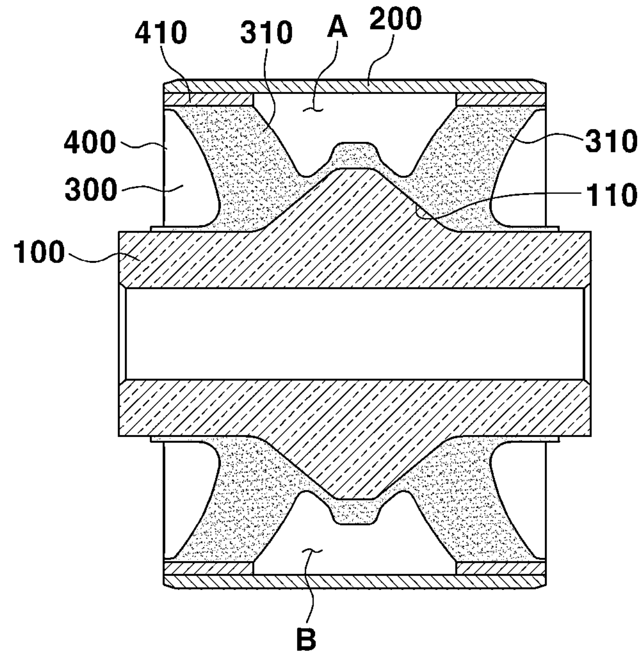
FIG. 5 is a view showing an embodiment of a middle plate for the motor mount device according to an embodiment of the present disclosure.
Figure 6:
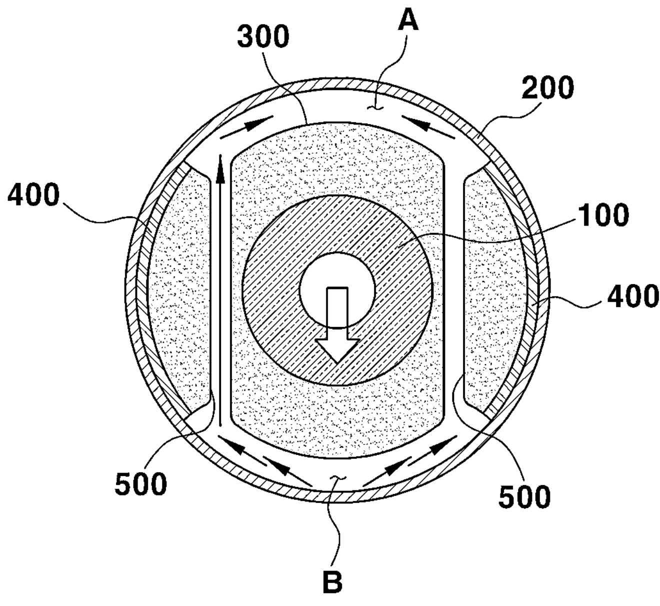
FIG. 6 is a view showing a first embodiment of air flow guides of the motor mount device according to an embodiment of the present disclosure.

In addition, FIG. 4 is a view showing a bridge of a main damper of the motor mount device for an electric vehicle according to an embodiment of the present disclosure. FIG. 5 is a view for showing an embodiment of a middle plate of the motor mount device for an electric vehicle according to an embodiment of the present disclosure. FIG. 6 is a view showing a first embodiment of air flow guides of the motor mount device for an electric vehicle according to an embodiment of the present disclosure.

Figure 7A:
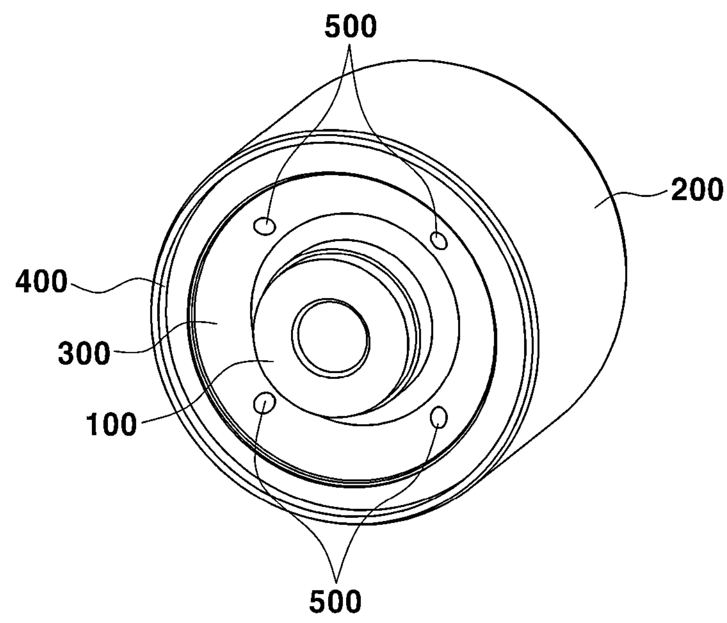
FIGS. 7A and 7B are views showing a second embodiment of air flow guides of the motor mount device according to an embodiment of the present disclosure.
Figure 7B:
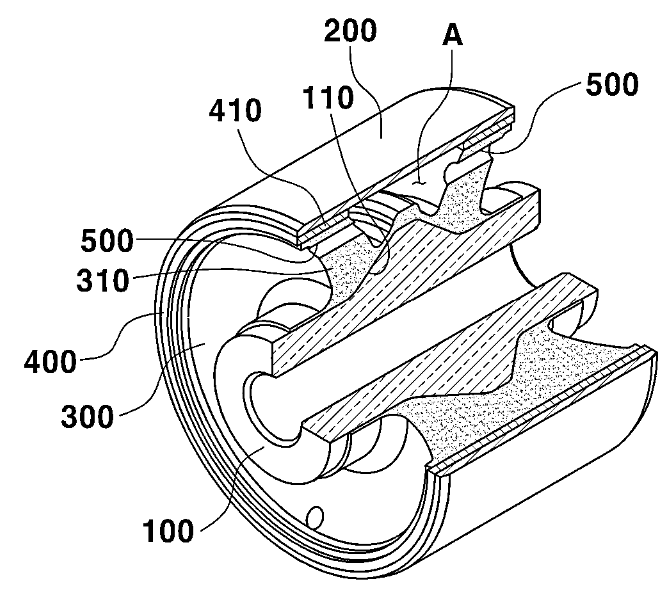
Figure 8:
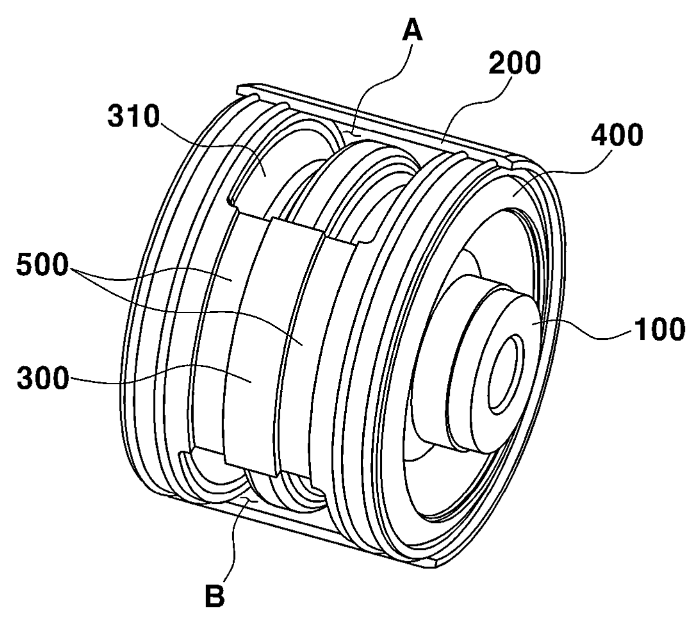
FIG. 8 is a view for showing a third embodiment of air flow guides of the motor mount device according to an embodiment of the present disclosure.

In addition, FIGS. 7A and 7B are views showing a second embodiment of air flow guides of the motor mount device for an electric vehicle according to an embodiment of the present disclosure. FIG. 8 is a view for showing a third embodiment of air flow guides of the motor mount device for an electric vehicle according to an embodiment of the present disclosure.

In general, in the case of a bushing mount on an electric vehicle platform, the bushing type motor mount device is mounted with an axial direction positioned as front-rear, i.e., the axis of the device is oriented in a front-rear direction of the vehicle. As a result, axial direction damping characteristics of the motor mount device are inevitably relatively low compared to left-right and up-down direction, i.e., radial direction, damping characteristics.

In this regard, when developing an electric vehicle platform, it may be desired to increase the axial direction damping characteristics to improve a feeling of a vibration. In other words, increasing the axial direction damping characteristics may reduce the feeling of a vibration felt by a passenger in the vehicle. However, when the axial direction damping characteristics are increased in this way, the up-down and left-right direction, i.e., radial direction, damping characteristics are also increased. Thus, a problem occurs in that a whine noise generated by the electric motor becomes worse because the damper is stiffened in all directions.

Accordingly, to solve the above problems, it is important to allow the left-right direction damping characteristics and the up-down direction damping characteristics to be maintained and only to improve the axial, that is, front-rear direction damping characteristics. To this end, as shown in FIG. 1, a motor mount device according to an embodiment of the present disclosure may include an inner pipe 100, an outer pipe 200, a bushing or main damper 300, and a middle plate 400. The bushing or main damper 300 may be made from rubber or a suitable rubber-like material. The inner pipe 100, outer pipe 200, and middle plate 400 may be made from steel, composites, or other suitably rigid or stiff materials.

The inner pipe 100 is disposed along the front-rear or forward-rearward direction of the vehicle. The outer pipe 200 is disposed coaxially with the inner pipe 100 and disposed around an outside of the inner pipe 100. The inner pipe 100 and/or the outer pipe 200 may instead be described or named as a tube, tubular, tube-like, vasiform, or the like.

In this case, the inner pipe 100 may be provided to have a central part 110 having an outer diameter that is relatively larger than an outer diameter of each of opposite end parts of the inner pipe 100. The central part 110 may be inside of the outer pipe 200 and, specifically, may have a bulge type structure as shown in FIG. 2.

In the case of the inner pipe 100 having such a bulge shape or structure, when a load is transmitted in the front-rear direction, damping may be generated by resistance occurring while pressing an inclined surface of the protruding central part 110 through the main damper 300. However, there is no structure for supporting the load transmitted in the front-rear direction, so the front-rear direction damping characteristics are unable to be effectively improved.

In addition, to improve the front-rear direction damping characteristics, a height of the main damper 300 becomes relatively low due to a structural feature of the bulge type inner pipe 100. Thus, a problem of a lack of damping may occur during an up-down or left-right movement of the inner pipe 100.

Therefore, the main damper 300 is made to be elastically deformable according to the load transmitted through the inner pipe 100. As shown in FIG. 3, a bridge 310 is provided in the axial or front-rear direction and the radial direction so as to define an upper chamber A and a lower chamber B between the inner pipe 100 and the outer pipe 200. The bridge 310 may provide a structure supporting loads in the front-rear direction of the inner pipe 100.

Here, the bridge 310 allows the upper chamber A and the lower chamber B to be formed in the main damper 300 and the bridge is provided to be inclined at each end, facing axially in the direction of the opposite ends of the inner pipe, towards the central part 110 of the inner pipe 100 along the front-rear direction of the main damper 300. As described above, as the bridge 310 is provided to have an inclination, that is, an angle of a predetermined degree, the load transmitted in the front-rear direction of the inner pipe 100 is supported as indicated by the direction of the arrows shown in FIG. 4. Thereby, the bridge 310 allows the front-rear direction damping characteristics with respect to the inner pipe 100 to be increased.

In addition, the middle plate 400 is disposed between the main damper 300 and the outer pipe 200. The middle plate 400 is configured to apply or allow pressure to be applied to an inclined direction with respect to the bridge 310. The bridge 310 is thereby provided to support a load in the front-rear direction transmitted through the inner pipe 100.

In other words, such a middle plate 400 is provided in a cylindrical shape including a pair of through holes H having a size and shape corresponding to the upper chamber A and the lower chamber B. Additionally, the middle plate 400 may be provided to include a support part 410 for compressing and supporting the bridge 310 toward the central part 110 of the inner pipe 100 (see FIGS. 2 and 3).

In this case, opposite end parts of the middle plate 400 in the front-rear direction surrounding the main damper 300 may be provided to be rounded.

In other words, with reference to FIG. 4, the opposite end parts of the middle plate 400, more specifically, a shape of each of the corners, i.e., front and rear edges, of the support part 410 are provided to correspond to a shape of the bridge 310 facing each corner of the support part 410. In such a structure, when the opposite end parts each including the corresponding parts of support part 410 of the middle plate 400 are provided to be rounded, pressing or compression of the bridge 310 may be made in a direction toward the central part of the inner pipe 100, so the load transmitted in the front-rear direction may be more effectively supported.

Such a limitation on the shape of the opposite ends of the middle plate 400 only corresponds to one embodiment, and the present disclosure is not limited thereto. For example, as shown in FIG. 5, a shape of the opposite end parts, including the corresponding parts of support part 410 of the middle plate 400 are provided to be flat.

Meanwhile, the main damper 300 may include air flow guides 500 provided to allow air to flow within the inside of the outer pipe 200 as an up-down direction load is applied to the inner pipe 100.

As shown in FIG. 6, the air flow guides 500 may be provided to pass through the main damper 300 along the up-down direction and connect the upper chamber A and the lower chamber B to each other (see FIG. 3).

With reference to a direction of the central arrow in FIG. 6, when the device of a motor mount (e.g., device connected or coupled to the motor mount) moves downward, air inside the device may flow freely along the air flow guides 500, so compressed air flows into the upper chamber A. Accordingly, it is possible to prevent an increase in dynamic damping characteristics caused by air compression.

Accordingly, the structure configured to support the load in the front-rear direction of the inner pipe 100 through the bridge 310 described above is applied. At the same time, the structure of the air flow guides 500 is applied. The structure thereby solves the conventional problem in that a whine noise inevitably gets worse as, when the front-rear direction damping characteristics are increased, the up-down direction damping characteristics are also increased.

Here, as shown in FIGS. 7A and 7B, the air flow guides 500 are provided to respectively connect the upper chamber A and the lower chamber B to the outside, i.e., to the exterior of the device, by penetrating through the main damper 300 including the bridge 310 along the front-rear direction. Accordingly, the air compressed in the upper chamber A and the lower chamber B may be selectively discharged to the outside when the inner pipe 100 moves in the up-down direction. An increase in dynamic damping characteristics caused by the air compression is thereby prevented.

In addition, as shown in FIG. 8, the air flow guides 500 may be provided along an outer circumferential surface of the main damper 300, thereby allowing the upper chamber A and the lower chamber B to be connected to each other. Accordingly, as in the above-described embodiment, the air compressed in the upper chamber A and the lower chamber B flows along the outer circumferential surface of the main damper 300, thereby preventing an increase in dynamic damping characteristics caused by the air compression.

The present disclosure has an effect of decreasing a whine noise of an electric vehicle motor. According to the present disclosure, a bulge-type inner pipe is applied. With respect to the inner pipe of such a bulge shape, the main damper, in which the upper chamber and the lower chamber are provided, is coupled to the middle plate for supporting the main damper to the inner pipe, while wrapping the inner pipe, so as to support the load in an axial direction. Additionally, according to the present disclosure, when the upper chamber and the lower chamber move in the up-down direction in a state of being sealed by the outer pipe, it is possible to increase selective front-rear damping characteristics by allowing air flow from the inside of the chambers through the air hole.

Accordingly, the present disclosure has an effect of solving the conventional problem that, when improving or increasing the front-rear direction damping characteristics, the up-down direction characteristics are also increased along therewith.

The present disclosure has been described with reference to the embodiment(s) shown in the drawings, but these embodiments are only provided by way of example, and various modifications may be made thereto by those of ordinary skill in the art. It should be appreciated that all or parts of the above-described embodiment(s) may even be selectively combined and configured. Therefore, the true scope of technical protection of the present disclosure should be defined by the technical spirit of the appended claims.

What is claimed is:

1. A motor mount device for an electric vehicle, the device comprising:

an inner pipe configured to be disposed along a front-rear direction of the vehicle;

an outer pipe disposed coaxially with the inner pipe and around an outside of the inner pipe;

a main damper with a bridge defining an upper chamber and a lower chamber between the inner pipe and the outer pipe along the front-rear direction and being elastically deformable according to a load transmitted through the inner pipe; and a middle plate disposed between the main damper and the outer pipe and provided to support a load in the front-rear direction transmitted through the inner pipe by compressing the bridge, wherein the middle plate has a cylindrical shape and includes a pair of through holes having a size and shape corresponding to the upper chamber and the lower chamber.

2. The device of claim 1, wherein the inner pipe has a central part with an outer diameter that is larger than an outer diameter of each of opposite end parts of the inner pipe, the central part disposed inside of the outer pipe.

3. The device of claim 2, wherein the bridge is inclined toward the central part of the inner pipe along the front-rear direction of the main damper.

4. The device of claim 1, wherein the middle plate has opposite end parts in the front-rear direction surrounding the main damper, respectively, wherein each of the opposite end parts is rounded.

5. The device of claim 1, wherein the middle plate has opposite end parts in the front-rear direction surrounding the main damper, respectively, wherein each of the opposite end parts is curved or bent.

6. The device of claim 1, wherein the main damper includes air flow guides provided to allow air to flow inside of the outer pipe as an up-down direction load is applied to the inner pipe.

7. The device of claim 6, wherein the air flow guides are provided to pass through the main damper along the up-down direction and connect the upper chamber and the lower chamber to each other.

8. The device of claim 6, wherein the air flow guides are provided to respectively connect the upper chamber and the lower chamber to an exterior of the device by penetrating through the main damper including the bridge along the front-rear direction.

9. The device of claim 6, wherein the air flow guides are provided along an outer circumferential surface of the main damper, thereby connecting the upper chamber and the lower chamber to each other.

10. A motor mount device for an electric vehicle, the device comprising:

an inner pipe disposed along a front-rear direction of the vehicle;

an outer pipe disposed coaxially with the inner pipe and around an outside of the inner pipe;

a main damper with a bridge defining an upper chamber and a lower chamber between the inner pipe and the outer pipe along the front-rear direction, the main damper being elastically deformable according to a load transmitted through the inner pipe;

a middle plate disposed between the main damper and the outer pipe and configured to support a load in the front-rear direction transmitted through the inner pipe by compressing the bridge; and air flow guides provided in the main damper and configured to allow air to flow inside of the outer pipe as an up-down direction load is applied to the inner pipe.

11. The device of claim 10, wherein the air flow guides are provided to pass through the main damper along the up-down direction and connect the upper chamber and the lower chamber to each other.

12. The device of claim 10, wherein the air flow guides are provided to respectively connect the upper chamber and the lower chamber to an exterior of the device by penetrating through the main damper including the bridge along the front-rear direction.

13. The device of claim 10, wherein the air flow guides are provided along an outer circumferential surface of the main damper, thereby connecting the upper chamber and the lower chamber to each other.

* * * * *